H. H. HOOD.
CAN SEAMING MACHINE.
APPLICATION FILED SEPT. 10, 1914.
1,222,955.
Patented Apr. 17, 1917.
13 SHEETS—SHEET 11.
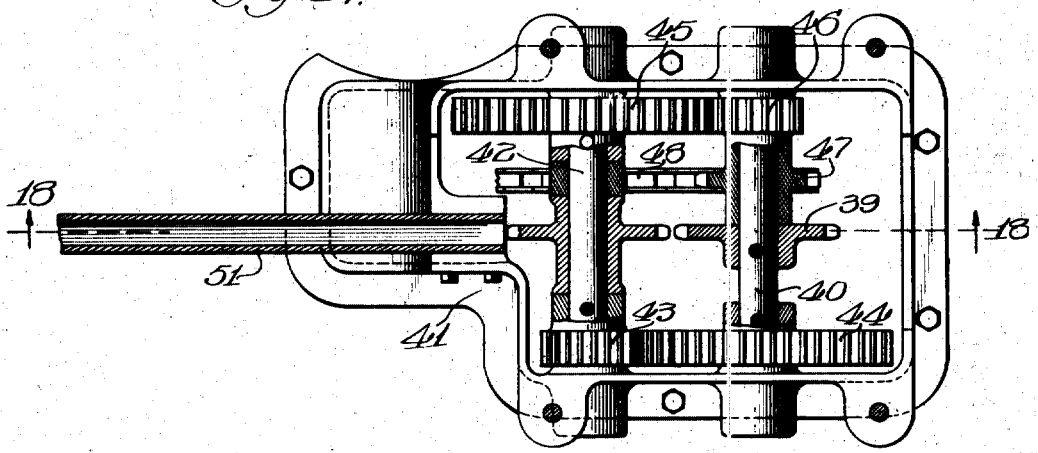
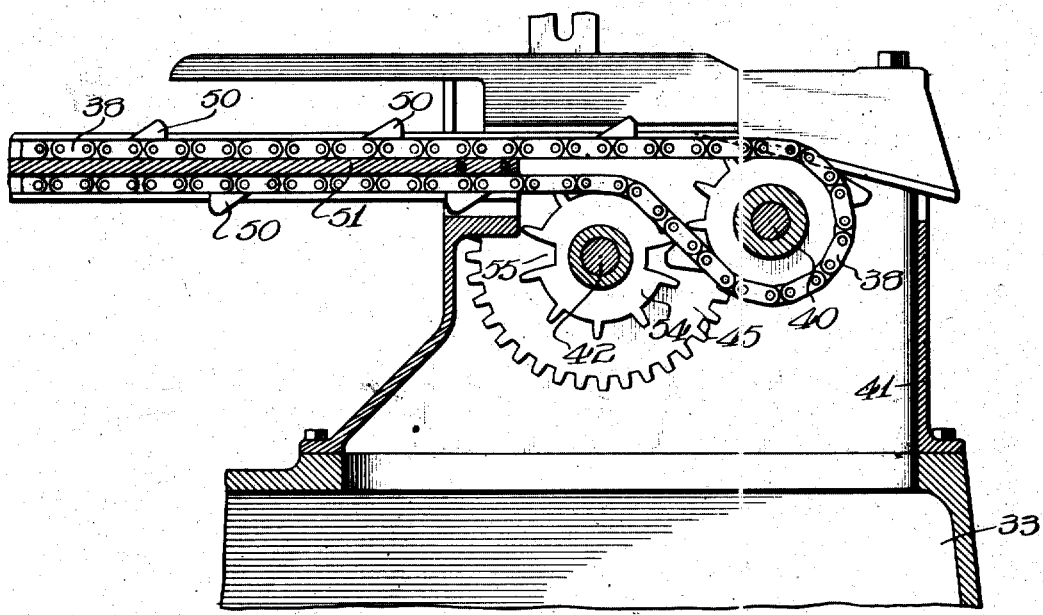
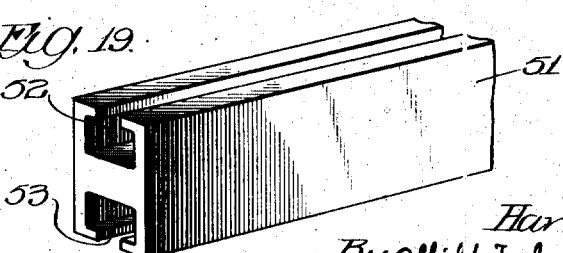
Witnesses:
Inventor:
Harry H. Hood
By Offield Towle Graves & Offield
Attys

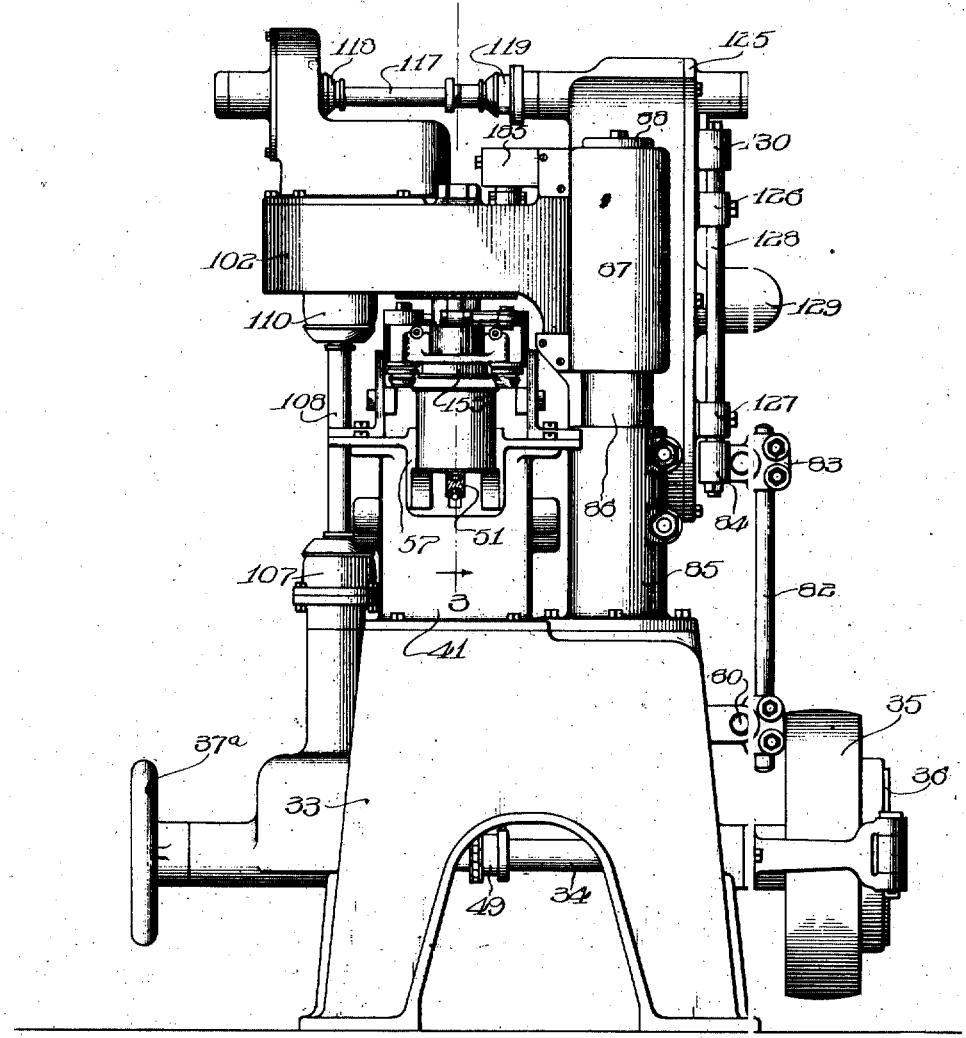

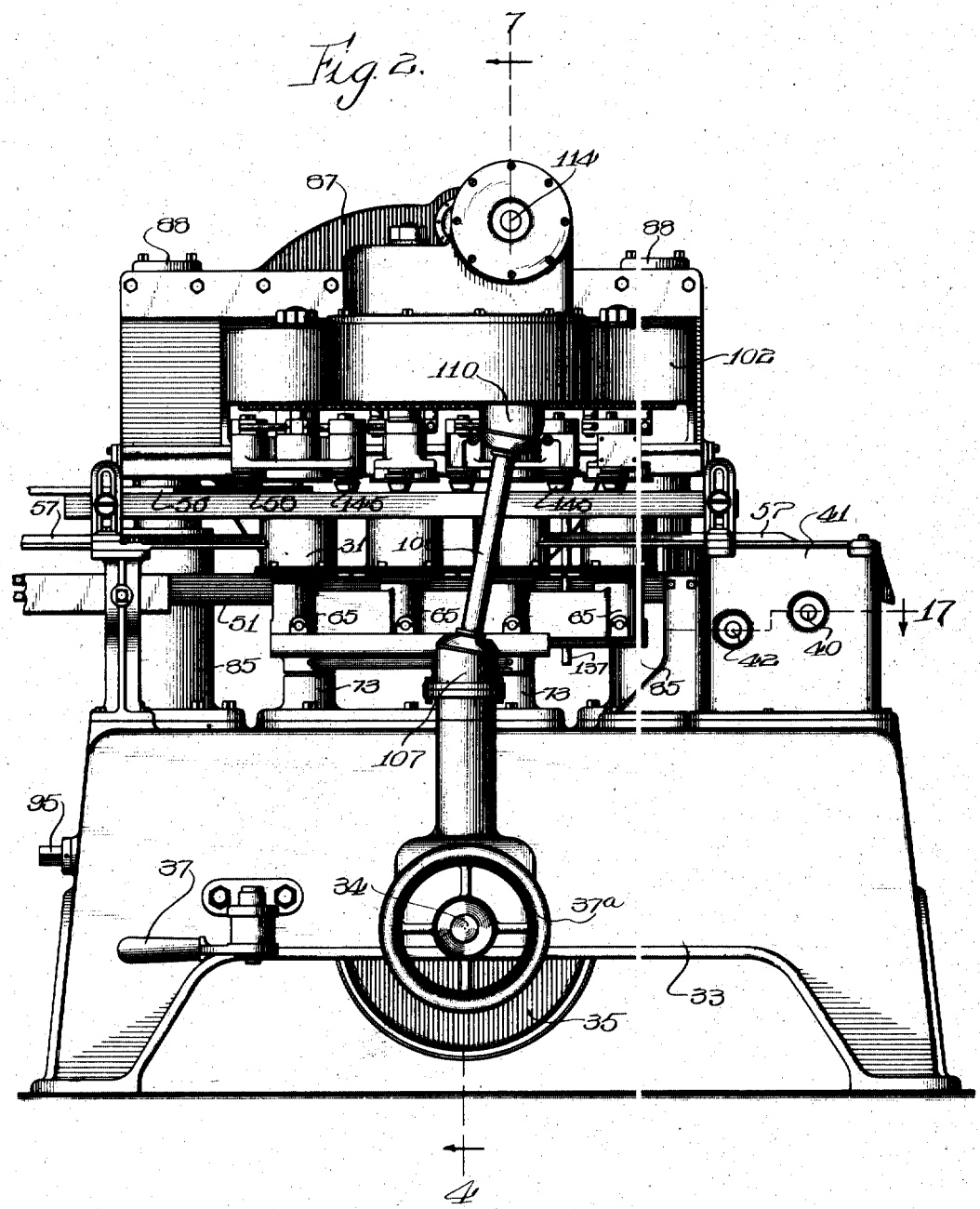

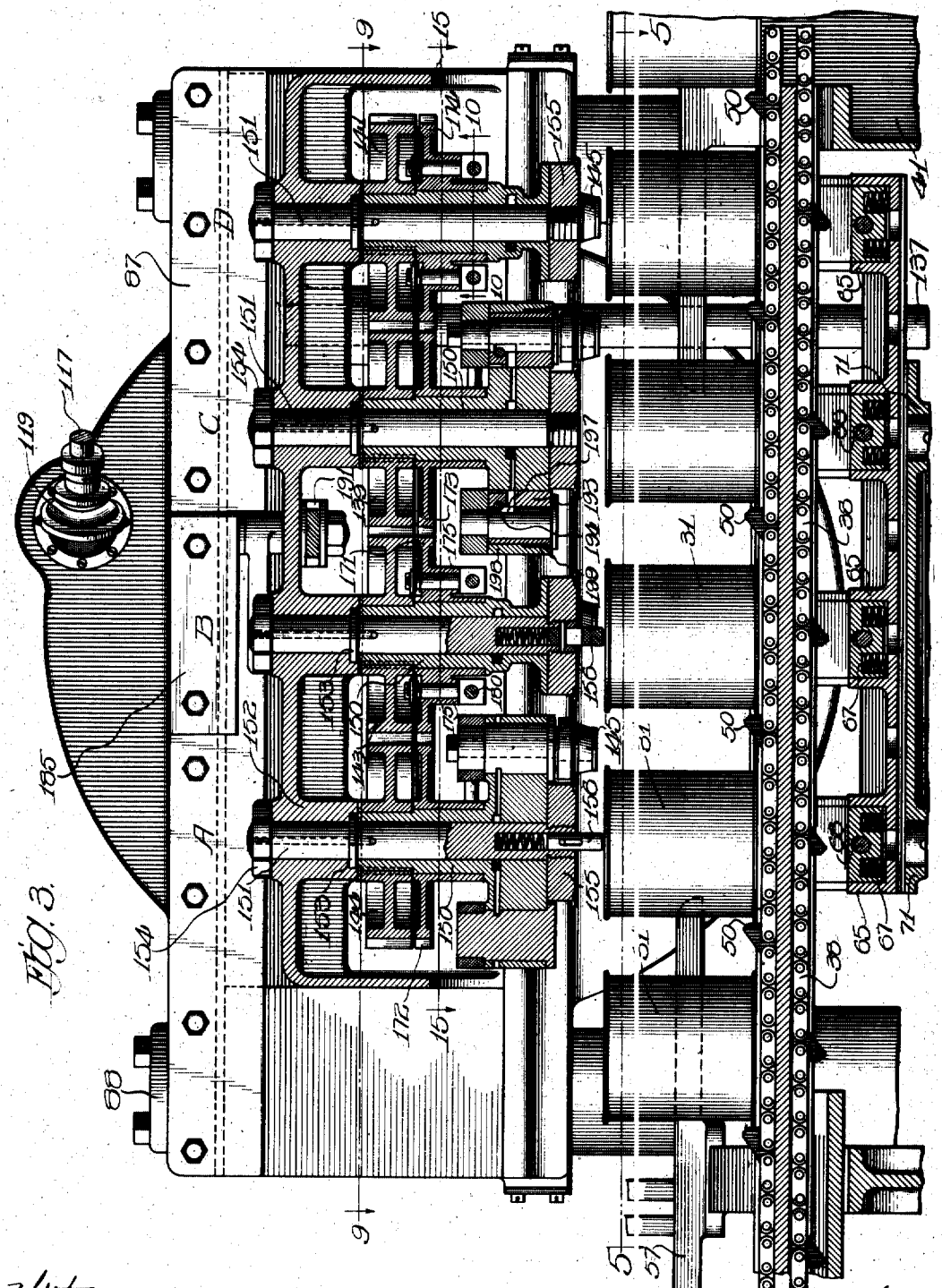

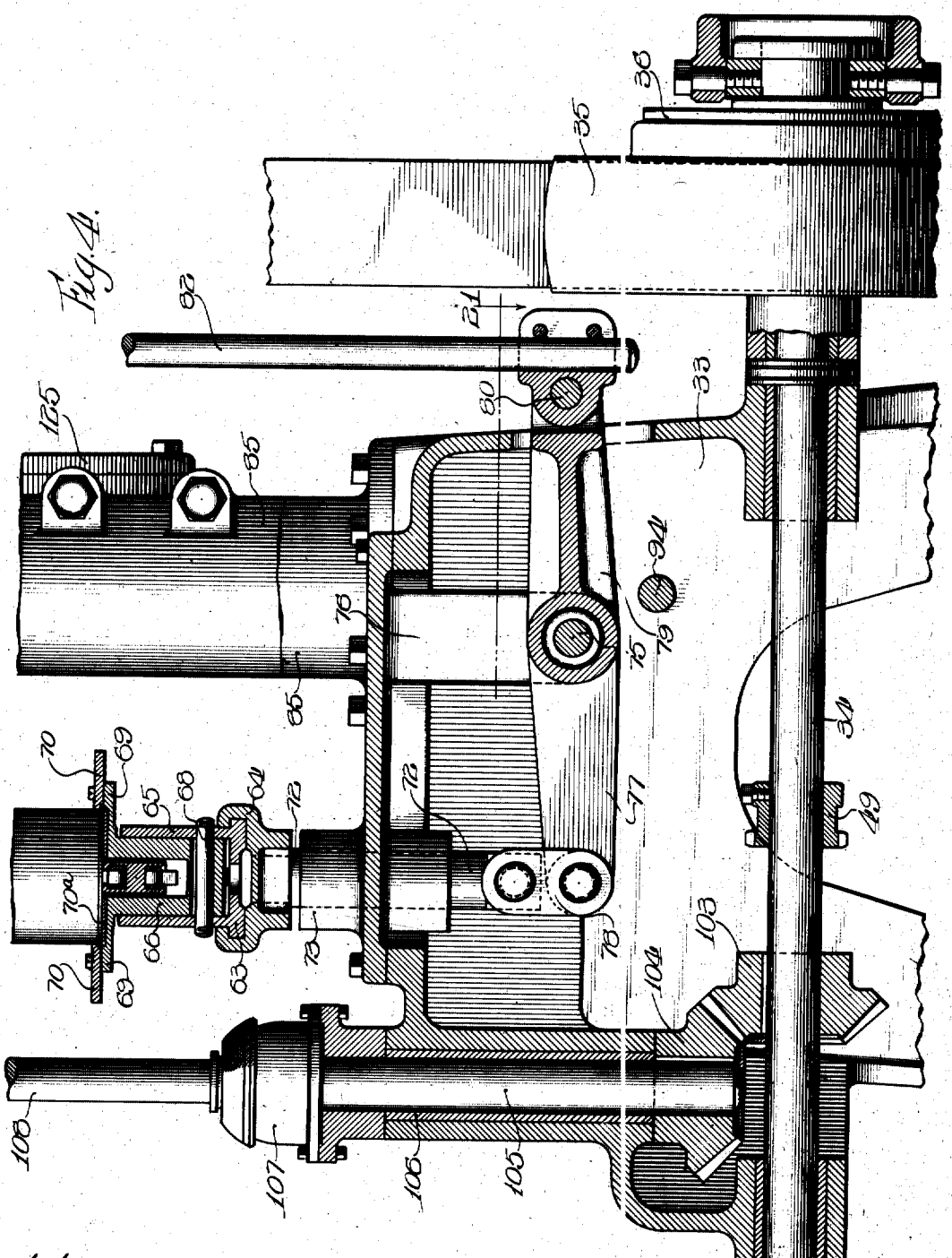

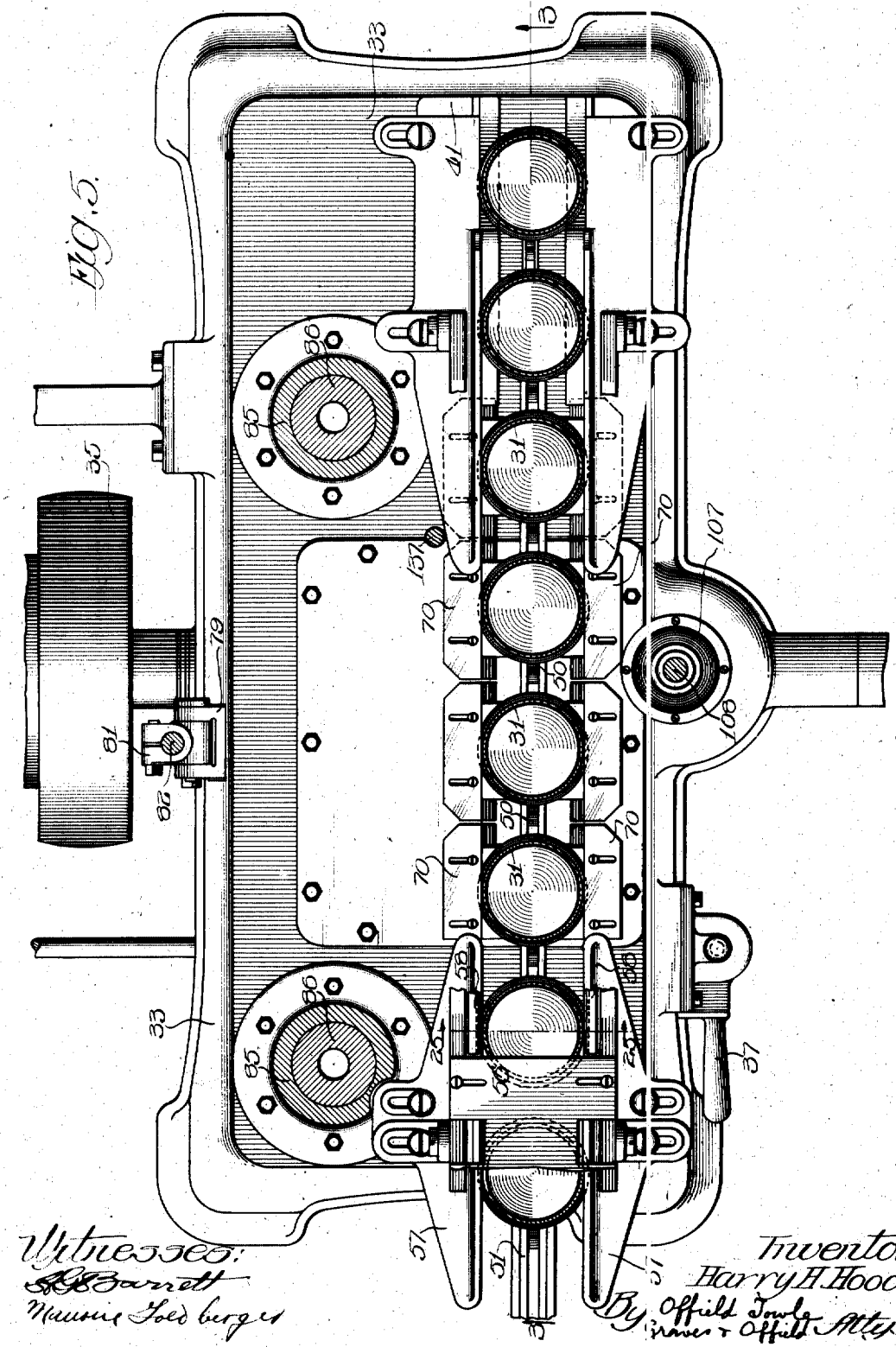

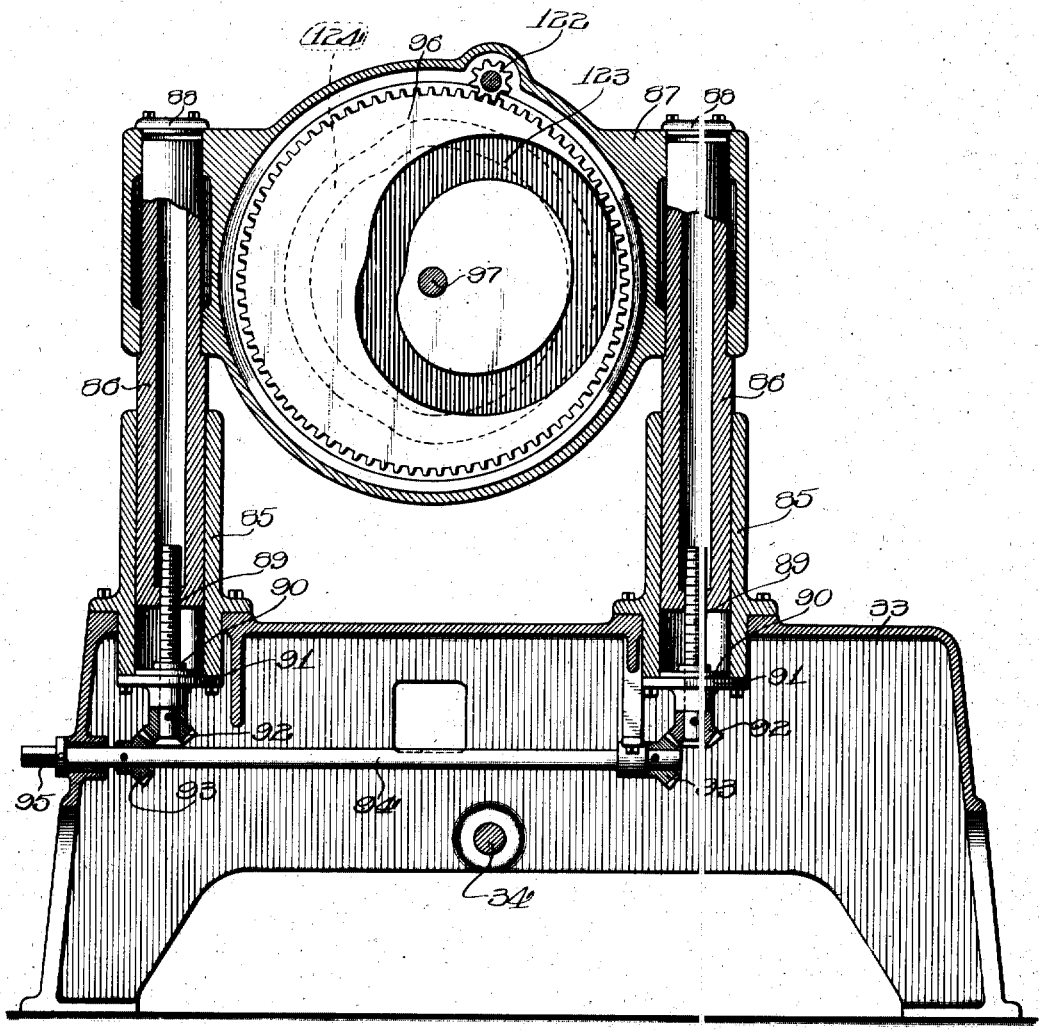

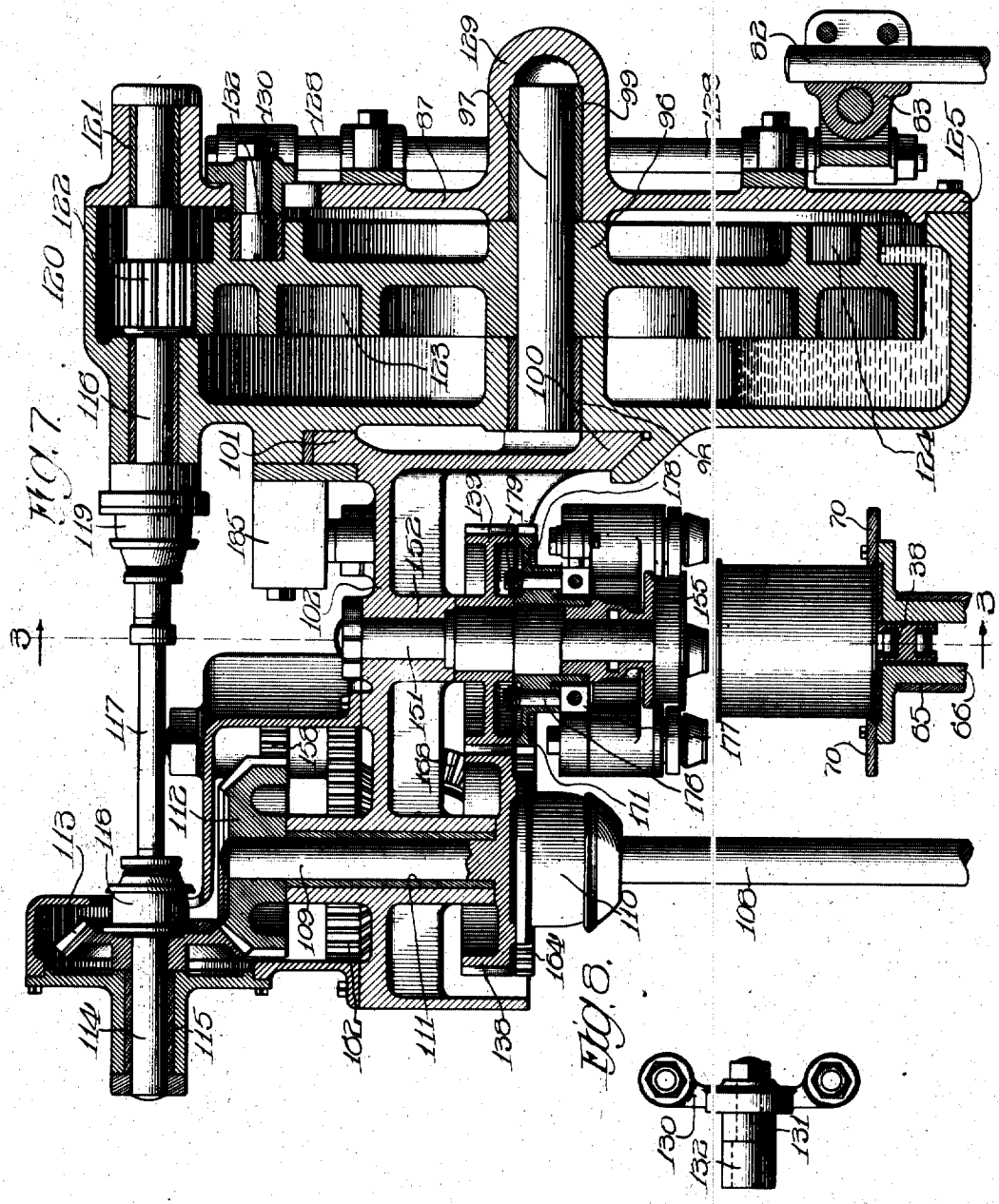

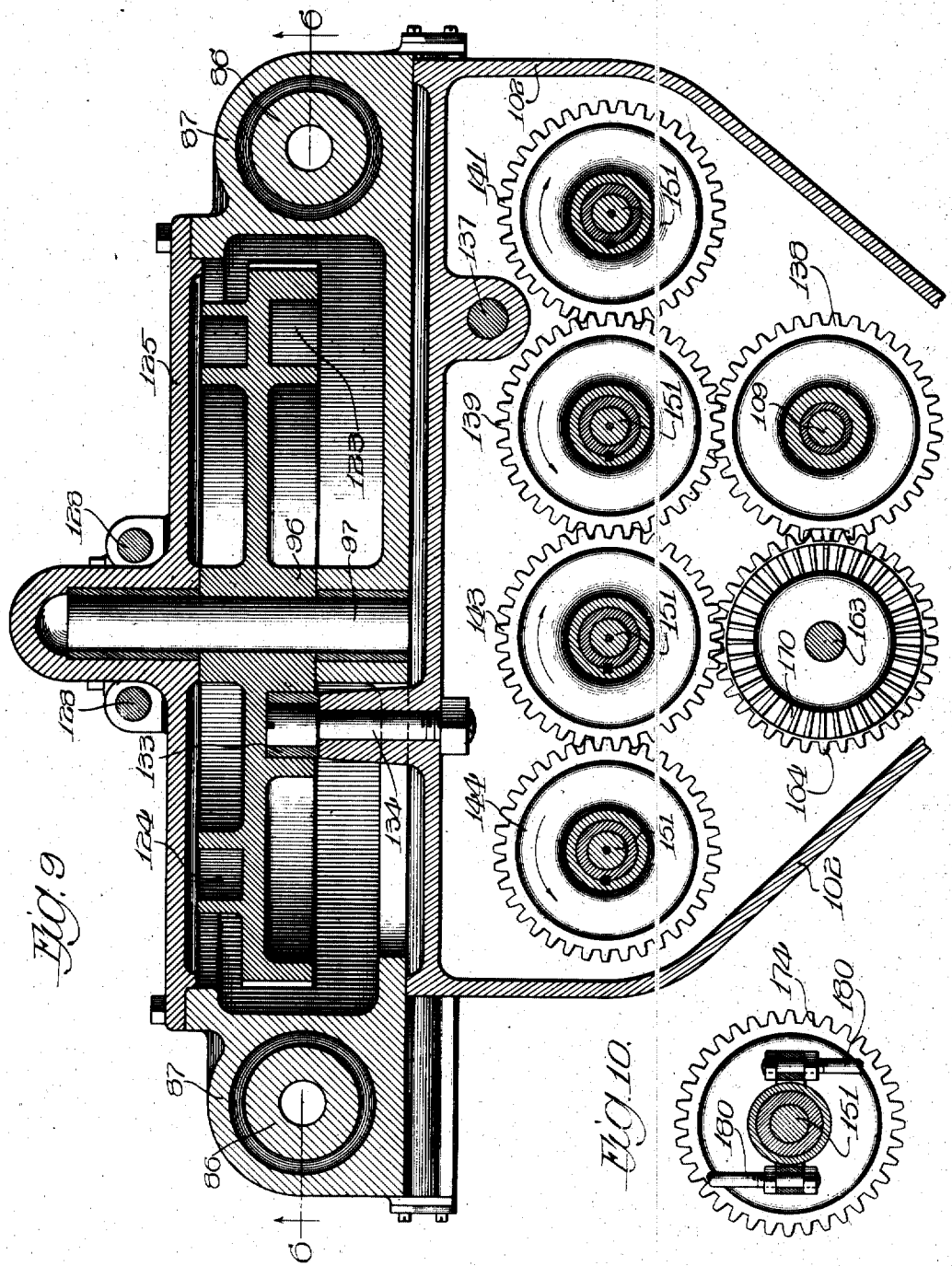

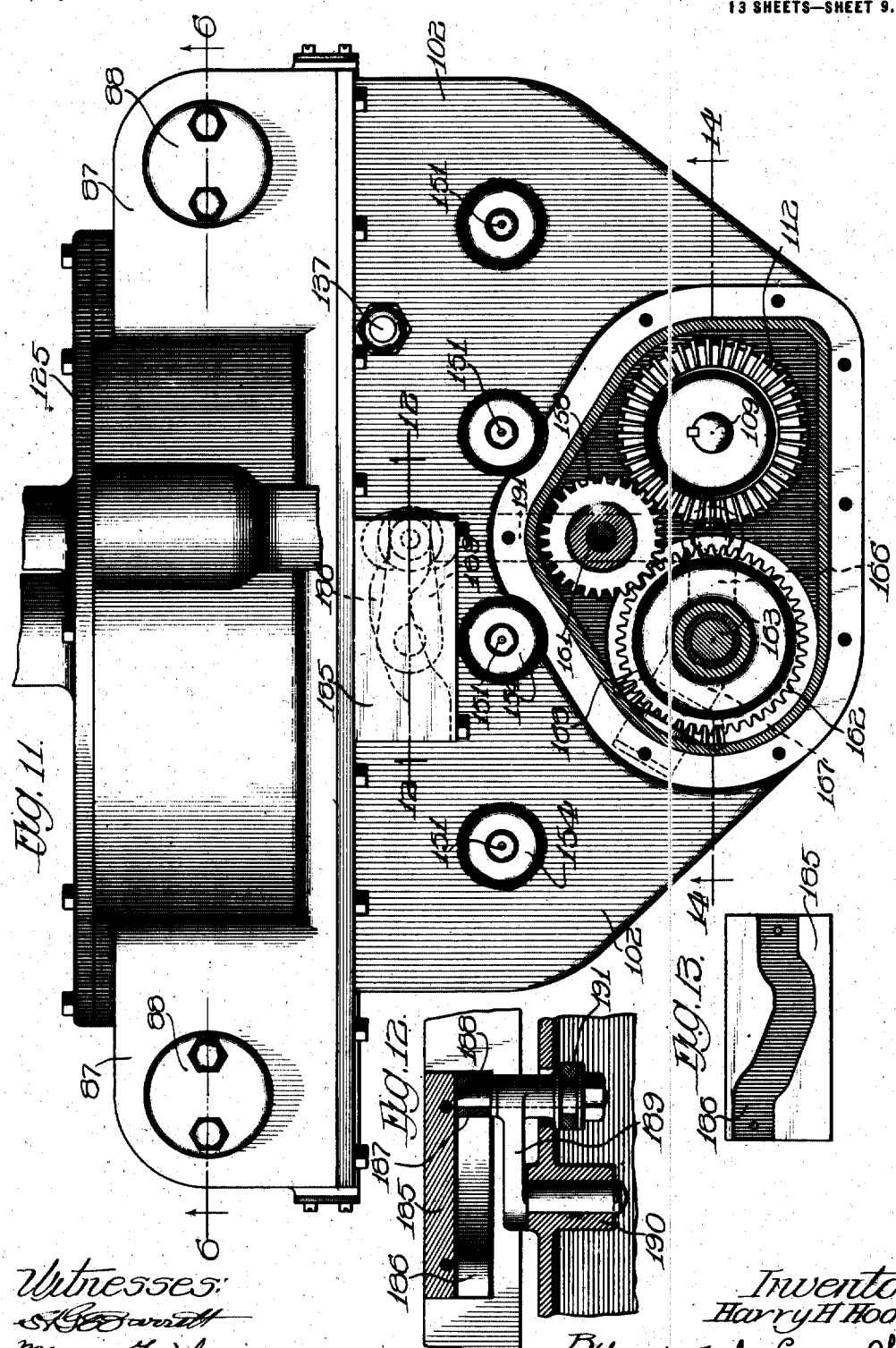

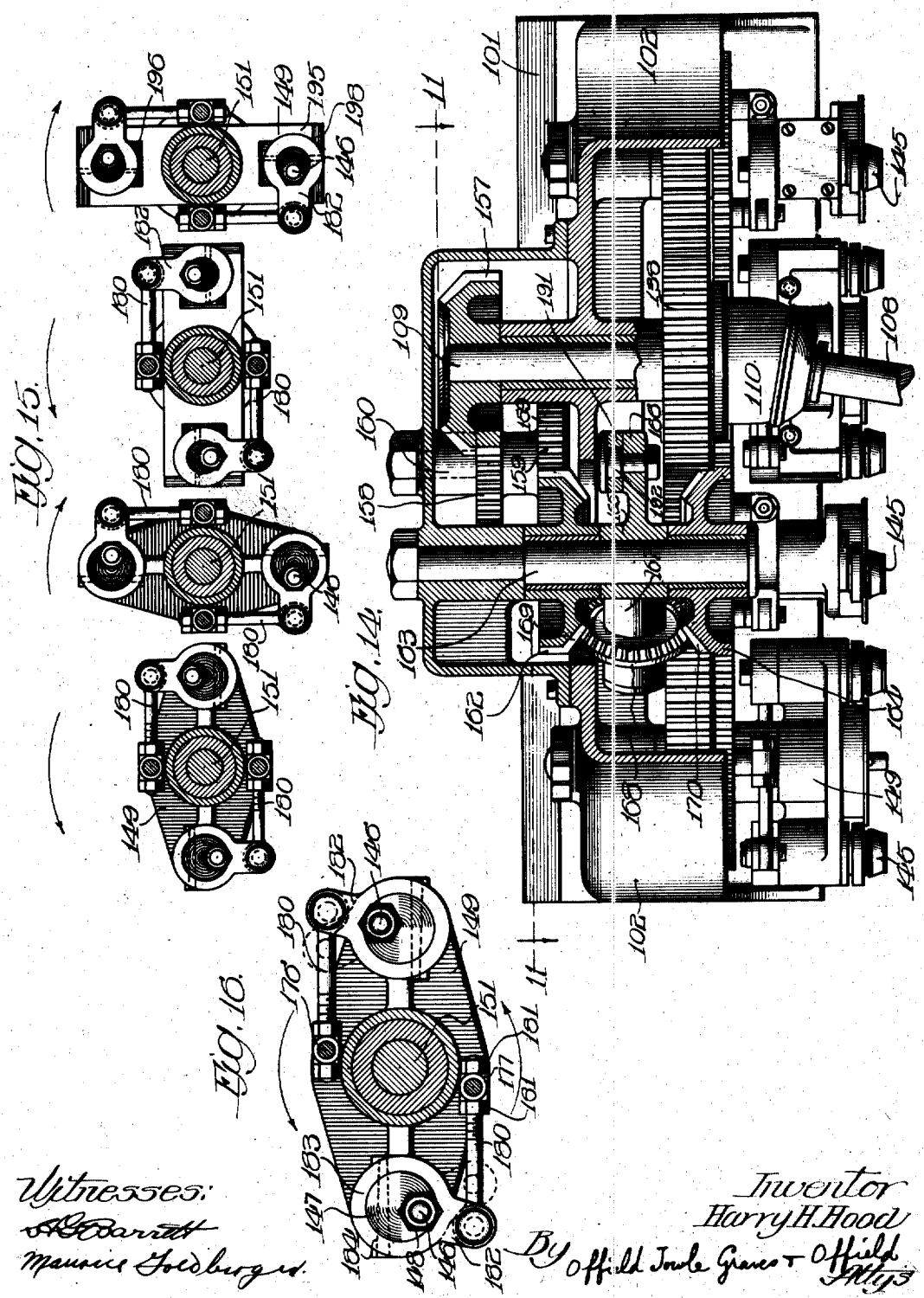

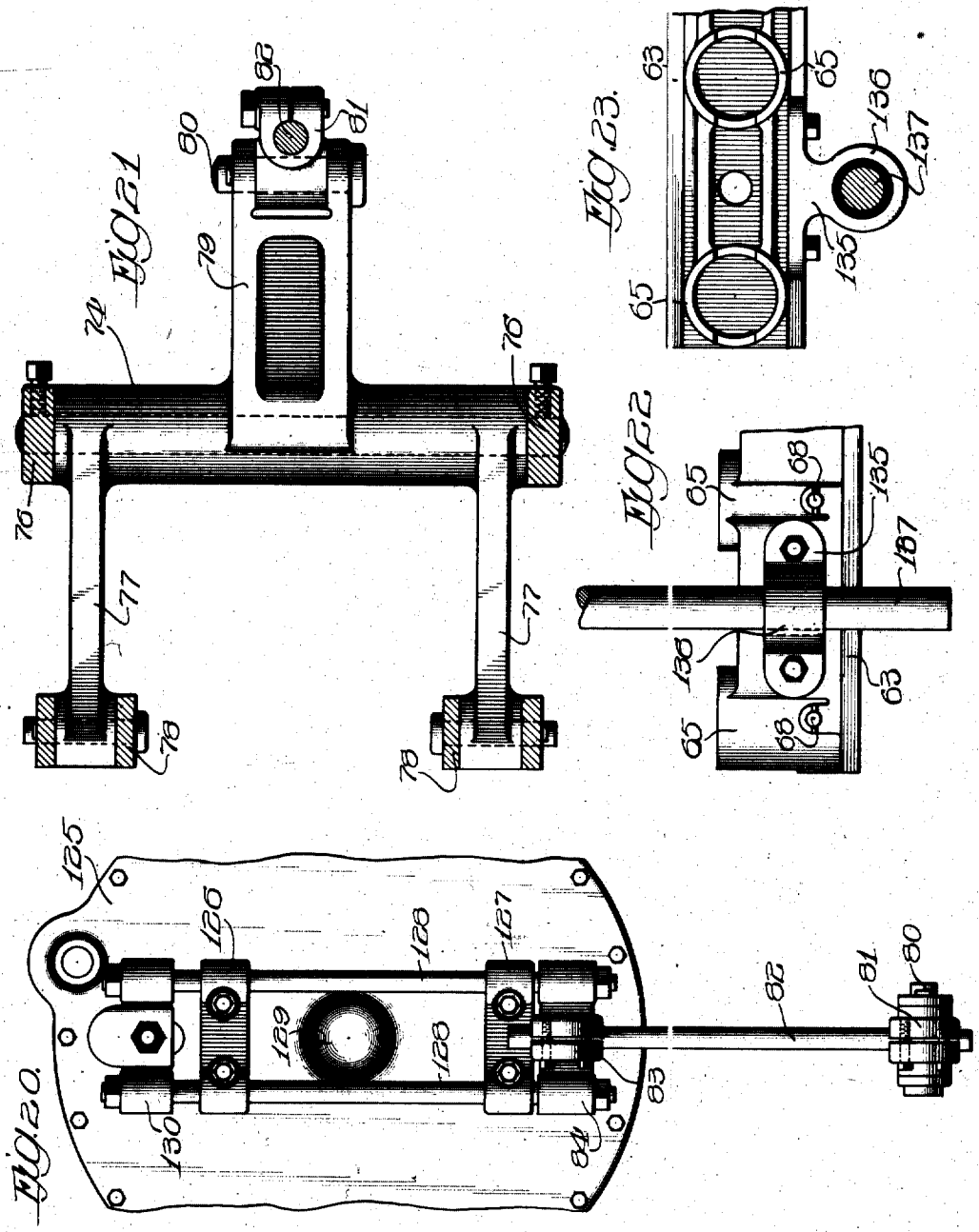

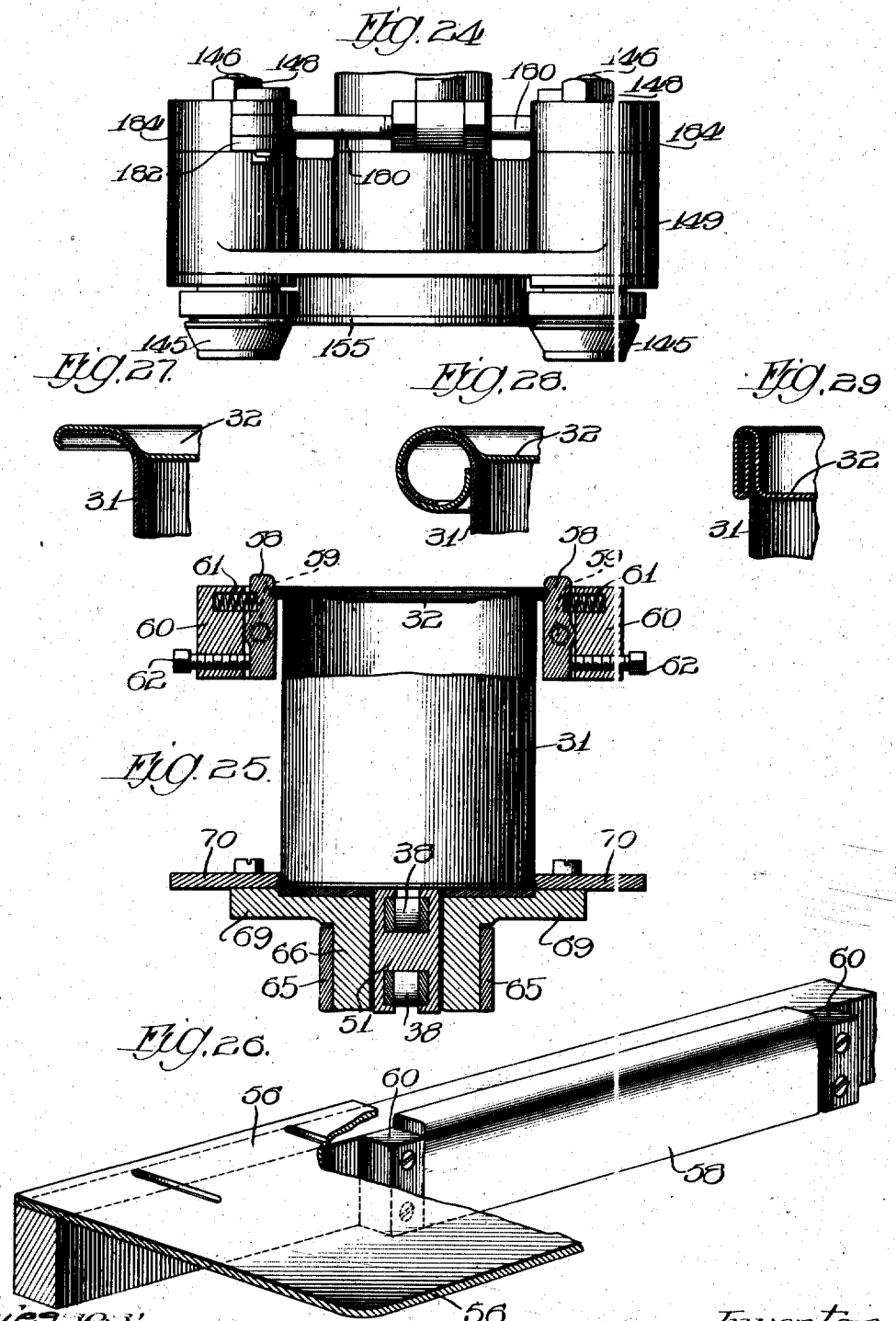

UNITED STATES PATENT OFFICE.

HARRY H. HOOD, OF CHICAGO, ILLINOIS, ASSIGNOR TO E. F. HERRMANN.

CAN-SEAMING MACHINE.

1,222,955.      Specification of Letters Patent.     Patented Apr. 17, 1917.

Application filed September 10, 1914. Serial No. 860,980.

*To all whom it may concern:*

Be it known that I, HARRY H. HOOD, a citizen of the United States, residing at the city of Chicago, in the county of Cook and State of Illinois, have invented certain new and useful Improvements in Can-Seaming Machines, of which the following is a specification.

My invention relates to improvements in can-seaming machines and refers to a type of construction which, while adaptable for many different uses, is particularly well fitted for seaming or crimping the heads or caps on cans which have been already filled with the material or product to be preserved therein.

Among the salient objects of the invention are, to provide a type of machine which is designed to perform a succession of crimping or seaming operations upon the can bodies; to provide a machine in which the cans are progressively presented to the seaming devices of the machine and automatically delivered therefrom when finished; to provide a construction in which a plurality of cans may be operated upon simultaneously by the seaming devices; to provide a machine in which a separate crimping head is employed for each successive different crimping operation; to provide an improved construction and novel type of mechanism for engaging the crimping rolls or seaming devices with the cans as the latter are presented to the machine; to provide a machine which is capable of ready adjustment to different sizes of cans; to provide a machine of the class described which is adapted to receive the filled cans in upright position and perform the seaming operations on said cans while the latter are maintained in upright position; to provide a construction of the class referred to in which there is no necessity for rotating the cans on their supports or changing their angular positions while they are passing through the machine; to provide a machine in which the general direction of travel of the cans while passing through the machine, is maintained constant; to provide a machine of the class referred to which shall be automatic in its operation, require a minimum of attention, and which is capable of being operated at a very high speed; to provide a machine which shall be cheap and economical in construction, and, in general, to provide an improved machine of the class referred to.

The novel features of my invention will be more readily understood when the description thereof is considered in connection with the accompanying drawings, in which—

Figure 1 is an end elevation of the complete machine;

Fig. 2 is a side elevation of Fig. 1;

Fig. 3 is a longitudinal section taken on the line 3—3 of Figs. 1 and 5;

Fig. 4 is a portion of an enlarged section taken on the line 4 of Fig. 2;

Fig. 5 is a sectional plan taken on the line 5—5 of Fig. 2;

Fig. 6 is a section taken on the line 6—6 of Fig. 9;

Fig. 7 is a section taken on the line 7 of Fig. 2;

Fig. 8 is a detail view of one of the cam roller mountings;

Fig. 9 is a section taken on the line 9—9 of Fig. 3;

Fig. 10 is a detail section taken on the line 10—10 of Fig. 3;

Fig. 11 is a section taken on the line 11—11 of Fig. 14;

Fig. 12 is a fragmentary section taken on the line 12—12 of Fig. 11;

Fig. 13 is an under side view of the cam track shown in Fig. 12;

Fig. 14 is a section taken on the line 14—14 of Fig. 11;

Fig. 15 is a sectional plan view showing the relation of the crimping heads, and taken on the line 15—15 of Fig. 3;

Fig. 16 is an enlargement of one of the crimping mechanisms shown in Fig. 15;

Fig. 17 is a section taken on the line 17 of Fig. 2;

Fig. 18 is a section taken on the line 18—18 of Fig. 17;

Fig. 19 is a fragmentary detail showing one end of the conveyer chain guide;

Fig. 20 is a fragmentary detail elevation showing the linkage for operating the can-elevating mechanism;

Fig. 21 is a section taken on the line 21 of Fig. 4;

Fig. 22 is a fragmentary detail elevation of a portion of the can-elevator;

Fig. 23 is a plan view of Fig. 22;

Fig. 24 is an elevation of a portion of one of the crimping heads;

Fig. 25 is a section taken on the line 25—25 of Fig. 5;

Fig. 26 is a perspective view of portions of the can guides;

Fig. 27 is a fragmentary detail section of the upper corner of the can and cap prior to crimping;

Fig. 28 is a similar view of the can and cap shown in Fig. 27 after the preliminary crimping operation has been performed; and Fig. 29 shows the completed seam.

As a preferred embodiment of my invention I have illustrated in the drawings, a machine which is designed to crimp or seam the caps or heads upon the tops of ordinary cylindrical cans which have been previously charged with fruit or other products to be preserved therein. In order to avoid spilling of the contents, it is obviously essential to present the unsealed cans to the crimping machine in upright position and to maintain the cans in the said upright position without vibration or irregular movements while the seaming operations are being performed on the can head.

Although the machine is capable of operating upon cans having variously shaped heads and forms of seams, the type of seam which I have selected to illustrate the operation is shown diagrammatically in Figs. 27, 28 and 29. Fig. 27 is a fragmentary view showing in section a corner of the filled can 31 and the head or cap 32 loosely resting thereon as the filled can enters the machine. Fig. 28 shows the seam partially formed by the first set of crimping rolls on the first crimping head, and Fig. 29 shows the completed seam on the sealed can after the latter has been operated upon by the second set of crimping rolls. The general scheme of operation of the machine may be briefly stated as follows: The filled cans, with the caps loosely resting thereon, are propelled through the machine by means of a continuously traveling conveyer chain which passes beneath a set of four crimping heads arranged in line with and directly over the center of the said chain. The crimping heads are arranged in pairs, the first two and the second two heads being precisely alike in the operations which they perform upon the cans, pairs of which are successively engaged by the successive pairs of crimping heads. The crimping heads are carried by a cross-head to which is imparted a reciprocatory motion of the same speed as that of the chain; thus, as the cans pass through the machine, the first two cans are automatically engaged with the first pair of crimping heads which perform the initial crimping operation on the heads of the said two cans while the latter and the cross-head are traveling in the same direction toward the delivery point of the machine. After the initial crimping operation has been completed on the two cans they are automatically disengaged from the first two crimping heads on the cross-head which at the same time reverses its movement and returns to the starting point where the next pair of cans on the chain are automatically engaged by the first pair of crimping heads, and the first two cans are also engaged by a second pair of crimping heads which perform the final crimping operation as the cross-head is again reciprocated with the cans in the direction of travel of the chain, the completed cans then being delivered from the machine. It should be understood that, although I have chosen as an illustration a machine equipped with similar crimping heads arranged in pairs, it is obvious that the same principle could be utilized in a machine having a single crimping head or one having several banks of similar crimping heads differently arranged for performing different successive crimping operations on a large number of cans simultaneously.

Describing the machine in detail, in Fig. 1 33 represents a heavy cast iron base which carries all of the working parts of the machine. The main driving shaft 34, which is suitably journaled in the base 33, is driven by a belt passing around the pulley 35, the latter being adapted to be engaged with the shaft 34 by means of a suitable friction clutch 36 operated by a handle 37 in any usual approved manner. The hand-wheel 37ᵃ, which is securely keyed to the front end of the shaft 34, is useful when it is desired to turn the shaft 34 by hand in order to make necessary adjustments of the various parts. The conveyer chain 38, which propels the cans through the machine, is driven by a sprocket wheel 39 keyed to a shaft 40 suitably journaled in a box-shaped casting 41, shown in Figs. 2, 17 and 18. This shaft 40 is driven at a reduced rate of speed from a shaft 42 by means of a spur pinion 43 secured to the said shaft 42 and a large spur gear 44 pinned to the shaft 40. The shaft 42 is similarly driven by means of a large spur gear 45 keyed to the said shaft 42 and by a pinion 46 meshing therewith and formed integral with a sprocket wheel 47 loosely journaled upon the shaft 40 and driven by a sprocket chain 48 which passes around a sprocket wheel 49 securely keyed to the main power shaft 34. The conveyer chain 38 is furnished with a succession of suitably spaced apart dogs 50 which engage the lower side edges of the cans and propel them through the machine. As will hereinafter appear, for mechanical reasons it is desirable to arrange the conveyer chain as compactly as possible, and therefore I prefer to support and guide same in its passage through the machine by means of a fixed guide or track-bar 51 which is suitably mounted in the frame of the machine. In this rectangular guide-bar 51 there are milled upper and lower T-shaped guide slots 52 and 53, the openings of which are of suitable width to admit the conveyer dogs 50. On its return from the delivery end of the machine, the chain is suitably guided into the lower slot 53 of the track-bar by means of an idler sprocket 54 rotatably mounted upon the shaft 42. It will be seen that this sprocket wheel 54 is at its periphery provided with a pair of suitably shaped notches 55 which admit the conveyer dogs 50 as the chain runs over the sprocket. In Fig. 3 there are shown a succession of cans passing through the machine from left to right. These cans may slide along upon the top of the track-bar 51 or other support, and are suitably guided prior to their entrance into the machine so as to keep them in proper alinement. It is understood that the conveyer chain 38 extends back as far as necessary into the filling room where the empty cans are charged with the desired product. The tops of the cans, before they enter the machine, are covered and held down in position by a horizontal protective plate 56, a portion of which is shown in Fig. 26, this plate being suitably supported at the desired height on either side of the line of cans. As the cans are propelled from under the end of the protective plate 56, they are forced into proper alinement with the center of the machine by means of a pair of guides 57 see Fig. 5, and while still forced into alinement by these guides, the cap flanges are engaged by a pair of opposed longitudinal presser members 58 see Figs. 5 and 25, which may be suitably grooved out at the upper ends of their inner opposed faces to conform with the shape of the end of the cap flanges. These members 58 are pivoted upon a pair of longitudinal pins 59 see Fig. 25 suitably supported in a pair of members 60 see Figs. 5 and 25 secured to the frame of the machine, and are forced inwardly by a plurality of spiral compression springs 61 seated in cylindrical bores formed in the inner faces of the said members 60. These grooved presser members 58, if desired, may be suitably adjusted by means of set screws 62. The object of the presser members 58, which extend almost to the center of the machine, is to hold the caps securely upon the tops of the cans while the latter are being elevated into engagement with the crimping devices by mechanism which will now be described.

Referring to Figs. 3, 4 and 5, it will be seen that the cans in their passage through the machine are supported by a longitudinal elevator member 63, which is a casting, the base of which is suitably planed off to reciprocate longitudinally within slight grooves formed in the upper face of a lift block 64. The elevator member 63 is formed with four upstanding bosses 65 which are suitably bored out from their upper ends to receive cushion blocks 66. These cushion blocks 66 are supported on a plurality of springs 67, shown in Fig. 3, and are prevented from rotating by means of transverse pins 68 passing diametrically through a collar in the bosses 65, and which also pass through the centers of the cushion blocks 66, the holes being suitably slotted to permit a slight vertical movement of the said cushion blocks. The cushion blocks 66 are formed with opposed longitudinal flanges 69, upon the upper surface of which are screwed pairs of adjustable guides 70 which maintain the cans in proper alinement while being operated upon by the seaming devices. The object in making the cushion blocks 66 spring-supported and separate from the elevator blocks 65 is to compensate for any mechanical irregularities in the heights of the different cans or in the adjustments of the various parts of the machine. This also takes care of any shortening up of the cans caused by the operation of the seaming devices. Upon a close inspection of Fig. 4 it will be seen that these guide plates 70 are notched out at their inner lower corners so as to admit the circumferential flanges formed by the crimping of the bottoms of the cans. This permits the cans to be pushed along in the guides, while at the same time vertical movement of the cans with reference to the cushion blocks is prevented. The tops of the cushion blocks 66 beneath the cans are furnished with wear-plates 70ª securely fixed thereto, these wear-plates being knurled or ribbed longitudinally in order to prevent rotation of the cans, while permitting longitudinal movement of the latter over said wear-plates. The lift-block 64 makes an up-and-down reciprocatory movement for each pair of cans that passes through the machine, and is operated as follows: Spaced apart longitudinally along the center line and at each end of the lift-block 64 I provide a pair of downwardly projecting bosses 71 (see bottom of Fig. 3), within which are secured a pair of vertical plungers 72 adapted to slide in guides 73 formed integral with a fixed portion of the frame of the machine. These guides 73 are long enough to prevent looseness of the plunger members and insure a direct upward motion of the lift-block 64 without wabbling. A reciprocatory movement is imparted to these plungers by the oscillatory lever 74 (see Fig. 21) which is pivoted upon a longitudinal shaft 75 secured in a pair of lugs 76 depending from the upper portion of the frame of the machine. This lever 74 is formed with a pair of spaced apart arms 77 which extend below and are connected to the lower ends of the plunger 72 by means of pairs of pivoted links 78. In the outer end 79 of the lever 74 there is secured a fixed pivot pin 80 upon which is pivoted a split clamping block 81, which latter is bored out to receive and grip the vertical actuating rod 82. The upper end of this rod 82 is secured in a somewhat similar clamping block 83 which is pivoted in a similar manner to the cross-piece 84 actuated by mechanism to be described later.

Referring to Fig. 6, it will be observed that at either end of the main frame 33 of the machine there is bolted a hollow vertical column 85 within which is adapted to slide a heavy rod 86. The ends of these rods 86 are turned off slightly to receive the bridge piece 87 which is bored out accordingly at either end and rests upon the shoulder thus formed by the reduction in cross-section of the upper ends of the rods 86. The upper ends of the bores of the bridge piece 87 are covered with suitable caps 88 to prevent entrance of dirt or other foreign matter. The rods 86 are bored out to admit freely the upper ends of a pair of upstanding screws 89 which are threaded into the lower ends of the said rods 86. These screws 89 are provided toward their lower ends with integral collars 90 supported upon circular journal plates 91 bolted to the lower ends of the columns 85, and within which the lower unthreaded ends of the screws 89 are adapted to rotate. To the lower projecting ends of the screws 89 there are pinned, or otherwise suitably secured, a pair of bevel gears 92 which are adapted to mesh with a pair of bevel gears 93 keyed to the longitudinal shaft 94. The longitudinal shaft 94 is suitably journaled in the frame of the machine and is furnished with a squared end 95, permitting the application of a wrench or other device when it is desired to actuate the screws 89 in order to raise or lower the rods 86 and with them the bridge piece 87. This raising and lowering mechanism just described is of exceptional utility where it becomes necessary to adjust the machine for variations in the sizes of the cans to be operated upon, as will be obvious from the description following later.

Referring to Figs. 6 and 7, it will be seen that the bridge piece 87 forms in effect a casing for a large spur cam gear 96 which latter is carried by a shaft 97 adapted to rotate in journal bearings 98 and 99 on either side of said casing. Referring to Fig. 7, it will be seen that the inner face of said casing is formed with a horizontal longitudinally extending set of guide grooves 100 and 101 within which there is adapted to slide a cross-head casting 102. Referring to Fig. 4, it will be seen that on the main shaft 34 of the machine there is keyed a bevel gear 103 which coöperates with a similar bevel gear 104 keyed to the lower end of a vertical shaft 105 adapted to rotate in a sleeve bearing 106 formed in the front of the frame of the machine. The upper end of this journal bearing 106 carries a housing which forms a protective cover for a universal joint bearing 107 connecting the upper end of the shaft 105 with an upwardly projecting operating shaft 108. This shaft 108, as seen in Fig. 7, is connected to a vertical shaft 109 by a somewhat similar universal joint connection designated as a whole 110. The universal joints 107 and 110 and the shaft 108 are so organized as to permit of a considerable extension or contraction of the distance between the centers of the said joints 107 and 110. This may be taken care of by using any one of several types of construction well known to those skilled in the art. The shaft 109 previously referred to is journaled in a bearing sleeve 111 secured in the cross-head casting 102, and the upper end thereof is secured in a bevel gear 112 which meshes with a bevel gear 113 keyed to a short transverse horizontal shaft 114 adapted to rotate in the projecting bearing 115 secured to the top of said cross-head casting 102. The right-hand end of the shaft 114 (see Fig. 7) is connected to the inner end of a transverse horizontal shaft 116 by means of a connecting shaft 117 and a pair of universal joint connections 118 and 119, this shaft and its universal joint connections being similar in function to the shaft 108 and the universal joints 107 and 110 previously described. Thus, through the train of mechanism just described, rotation of shaft 34 results in a corresponding rotation of the horizontal shaft 116. This shaft 116 is journaled in a pair of bearings 120 and 121 secured to the top of the bridge piece 87, and on said shaft between its bearings there is keyed a spur pinion 122 meshing with the large cam gear 96 previously referred to. On the inside of the cam gear 96 there is formed a continuous cam groove 123, and on the outside of the said cam gear there is formed a somewhat similar cam groove 124. The function of the cam groove 123 is to reciprocate the cross-head 102, and the cam groove 124 is made use of to cause a raising or lowering of the cans to engage them with the crimping devices.

Referring to Fig. 7 and back to Fig. 20, it will be seen that on the back cover 125 of the cam gear casing there are secured a pair of guide blocks 126 and 127 within which are adapted to slide a pair of rods 128 which are spaced apart a sufficient distance to avoid the outer cover 129 of the bearing 99. At their lower edges these rods 128 are secured in the block 84 previously referred to, and at their upper ends they are secured in a somewhat similar block 130, a plan of which is shown in Fig. 8. This block 130 is bored out transversely to receive a pin 131 upon which is rotatably mounted a cam roller 132 adapted to engage and travel within the cam groove 124. The cam groove 124 is so organized as to impart a slight upward or downward movement to the cam roll 132 at suitable intervals in the cycle of operations. This upward or downward movement of the cam roll thus results in a corresponding upward or downward movement of the cans by virtue of the train of mechanism previously described. The amount of this vertical reciprocatory movement of the cans is not extensive but simply sufficient to move the cans into or out of the field of the crimping devices.

Referring to Fig. 9, it will be seen that the inner cam groove 123 is engaged by a cam roller 133 rotatably mounted upon a transverse horizontal pin 134 rigidly secured in the cross-head casting 102. As previously referred to, this cross-head casting 102 is adapted to slide within the horizontal guides 100 and 101 formed longitudinally in the face of the bridge piece 87, and thus each rotation of the cam gear 96 causes a horizontal reciprocation of the cross-head 102. The shape and dimensions of the cam groove 123 are such as to impart to the cross-head 102 a traveling movement the same in speed and direction as the travel of the cans when the latter are engaged by the crimping devices carried by the said cross-head 102. Referring to Figs. 22 and 23, which illustrate in elevation and plan the right-hand end of the elevator member 63, it will be seen that on the side of the said elevator member there is secured a small bracket block 135 which is bored out vertically to receive a sleeve 136 constituting a vertical guide or bearing for a relatively stiff rod 137 depending from the reciprocatory cross-head 102. Thus there is imparted to the elevator member 63 the same reciprocatory horizontal movement as is imparted to the cross-head 102. It should of course be understood that as the cross-head moves forward in the direction of travel of the cans, the latter are elevated into engagement with the seaming devices carried by the cross-head, and while in such engagement the cans, cross-head and elevator block move forward as a unit at the same speed as that of the normal travel of the cans while under the influence of the conveyer chain 38. When the seaming operations have been performed and while the cans, cross-head and elevator member are still moving together as a unit, the last named member moves down and draws the cans away from the seaming devices and again into engagement with the dogs of the conveyer chain. It should be understood that the points of the conveyer dogs 50 are beveled slightly in order to compensate for slight irregularities in the downward movements of the cans after being operated upon.

Describing the seaming devices carried by the cross-head 102 and referring to Figs. 7 and 9, it will be seen that the vertical shaft 109, previously referred to, is formed with an integral spur gear portion 138 which meshes with a corresponding spur gear 139. This gear 139 meshes with a similar gear 141, said gears driving the two secondary crimping heads for performing the final seaming operation, and also drives the two initial crimping heads through the gears 143 and 144.

The crimping heads for performing the initial crimping operations will be designated as A and B and the heads for performing the final seaming operation will be designated C and D. Describing the crimping rolls associated with the heads A and B,—these rolls 145 are rotatably mounted upon vertical pins 146 (see Figs. 16 and 24) which pass through and are eccentrically secured in short shafts 147 by means of nuts 148 screwed to the top of the said pins 146. These short shafts 147 are adapted to rotate within vertical bores formed in the opposed ends of the spinners 149. These spinners 149 are formed with upwardly extending integral bearing sleeves 150 which are adapted to rotate upon the fixed shafts 151 depending from bosses 152 formed in the upper portion of the cross-head 102. These shafts 151 are suitably keyed in these bosses 152 and are provided with integral collars 153, by means of which they are securely drawn up into place by means of clamping nuts 154. Downward movement of the spinners on the shafts 151 is prevented by the presence of the chuck disks 155 which are screwed and keyed to the lower ends of the said shafts 151. These chuck disks 155 are, on their lower faces, turned into the proper shape to engage the tops of the can caps and are knurled circumferentially at their outer edges in order to prevent rotation of the can caps with reference to the chucks while the seaming operations are being performed. In order to prevent the can caps from rising from the tops of the cans, which might be caused by accidental mal-formation of the can bodies or by an over supply of the contents of the filled cans, I insert a spring-pressed plunger 156 in the lower end of the shafts 151 with the seaming heads A and B. These plungers 156 extend down toward the tops of the cans as far as practicable so as to engage the latter and hold the caps in place as soon as the cans are elevated and leave the influence of the spring-pressed longitudinal guide members 58.

Referring back to the crimping roll drive, the upper ends of the sleeves 150 are keyed into the gears 144, 143, 139 and 141, previously referred to (see Figs. 3 and 9), which are all meshed together and are driven by the gear 138. It is thus obvious that as the shaft 108 rotates, which it does continuously, the crimping rolls associated with each head execute a planetary movement around the axis thereof continuously and uniformly. The means for moving the crimping rolls radially into engagement with the can seam flanges in order to crimp the same will now be described.

Referring to Figs. 7 and 14, it will be noticed that the bevel gear wheel 112, previously referred to as being continuously driven by the shaft 109, is provided on its circumference with spur gear teeth 157 which mesh with teeth on a spur gear 158. The spur gear 158 and a lower spur gear 159 are both formed integrally with a hub 160 which rotates upon a fixed shaft 161 (see Fig. 11), and thus the rotation of the shaft 109 causes a corresponding rotation of the spur gear 159. The latter meshes with a spur gear 162 which is adapted to rotate freely upon a fixed stationary shaft 163. Upon the fixed shaft 163 and at the lower end thereof there is also rotatably mounted a somewhat similar spur gear 164, the two gears 162 and 164 being spaced apart by a rotatable collar or hub 165. This collar 165 is formed with a pair of opposed radial integral arms 166 and 167, and on the latter arm there is mounted upon a radial axis a freely revoluble bevel gear 168. This bevel gear 168 is adapted to mesh with bevel gear teeth 169 formed on the lower edge of the spur gear 162, and with bevel gear teeth 170 formed on the upper edge of the spur gear 164. If the member 165 be now considered to be stationary, rotation of the gear 162 will cause a corresponding rotation of the gear 164 by reason of the bevel gear connections just described. The spur teeth of the gear 164 which, as shown, is mounted in a lower horizontal plane than the principal gears 138, 139, etc., are adapted to mesh with a narrow-faced spur gear 171 which is adapted to rotate freely upon the sleeve 150 of the crimping head B. This latter gear in turn drives similar gears 172, 173 and 174 mounted on the rotating sleeves 150 of the heads A, C and D. The gears 139, 141, 143 and 144, previously referred to, are all of the same size and consequently rotate at precisely the same speed; which is also true in the case of the gears 171, 172, 173 and 174. The latter gears run in the same direction as the former set of gears, and the number of teeth in the connecting gearing on the shafts 161 and 163 is such that they run at the same average speed (assuming the member 165 to be stationary). However, if the member 165 be changed in its angular position on the shaft 163, the bevel gear 168 will throw the gears 162 and 164 out of step with each other by an amount equal to twice the amount of the angular displacement of the member 165. This feature is made use of to effect the engagement of the crimping rolls with the can seam by a train of mechanism now to be described.

Referring to Figs. 3 and 7, it will be noticed that the hubs of the gears 171, etc., are formed with opposed axially parallel depending bosses 175. Within these bosses 175 there are rotatably mounted pairs of rotatable studs 176, these studs being formed with integral square heads 177 at their lower ends and prevented from falling out by springs 178 interposed between the upper sides of the said gears 171, etc., and washers 179 fixed to the tops of the said studs 176. As indicated in plan in Fig. 16, these square heads 177 are bored out transversely to receive wrist rods 180, the ends of which are threaded and adjustably secured within the said heads 177 by means of nuts 181. The outer ends of the said rods 180 are enlarged and are pivotally connected to arms 182 integrally formed with the collars 183, the latter being rigidly secured to the eccentric shafts 147 by taper pins 184. Upon examination of Fig. 16, while at the same time bearing in mind that the studs 176 are carried by the thin gears 171, etc., while the members 149 are mounted upon and rotate with the gears 139, etc., it is obvious that a relative angular displacement of the gears 171, etc., with reference to the gears 139, etc., will cause a relative displacement of the studs 176 around the center of the members 149. Obviously, this will cause the members 147 to rotate slightly on their vertical axes and will result in a movement of the crimping roll pins 146 toward or from the centers of their orbits. Thus, it is manifest that to engage the crimping rolls with the can it is simply necessary to rotate the member 165 slightly at the proper moment in the cycle of movements. The proper angular displacement of the member 165 is effected by the following mechanism.

Referring to Figs. 3, 7 and 11, it will be noticed that to the center of the inner face of the bridge piece 87 there is bolted a cam block 185, the latter being provided on its under side with a cam groove 186, indicated in dotted lines in Fig. 11 and shown more clearly in reverse plan in Fig. 13. Referring to Figs. 12 and 13, it will be seen that the cam groove 186 is engaged by a cam roller 187 which is rotatably mounted upon a pin 188 carried by the end of a swinging arm 189 pivotally mounted in a boss 190 formed integral with the upper side of the reciprocatory cross-head 102. The lower end of the pin 188 is enlarged somewhat to form a pivot for the end of a transverse link 191, indicated in dotted lines in Fig. 11 and in section in Figs. 3 and 12. As indicated in dotted lines in Fig. 11, the other end of this link 191 is pivoted upon a pin 192 secured in the end of the arm 166 formed integral with the member 165, previously referred to (see also Fig. 14). It is obvious that as the cross-head 102 is reciprocated in its horizontal guides, the link 191 will also be caused to reciprocate transversely by means of the cam groove and cam connections just described; this will result in a corresponding displacement of the member 165 around its axis and cause the seaming rolls to move inwardly or outwardly to or from the centers of their orbits. The cam groove 186 is so shaped as to cause a gradual movement of the crimping rolls toward the centers, this movement commencing as the cans are elevated into engagement with the chucks and being discontinued somewhat abruptly when the cross-head approaches its left-hand limit of reciprocation. Thus, while the cans are being elevated or pulled down into or out of engagement with the chucks, the crimping rolls are widely separated and do not interfere with the said vertical movement of the cans.

The seaming heads C and D are slightly differently constructed from the heads A and B. In the first place, it is understood that the shape of the rolls is such that the form of the seam when completed is as shown in Fig. 29. In the second place, since the completed seam shown in Fig. 29 has its parts folded into intimate engagement with each other, some provision must be made for permitting the rolls to spring apart slightly when the bump caused by the longitudinal seam in the cylindrical portion of the can body passes under the rolls. This is taken care of by pivoting the rolls resiliently in the spinner members of the heads C and D for performing the final seaming operation. Referring to Figs. 3, 14 and 15, it will be seen that the eccentric shafts 147 of the crimping heads C and D are not mounted directly in the arms of the spinner members 149, but within rectangular blocks 193 loosely mounted upon pivots 194 extending through said blocks 193 and securely riveted within the sides 195 of radial open-ended slots 196 formed in the ends of the said spinner members 149. The eccentric shafts 147 of these two heads C and D are made somewhat smaller than those of the heads A and B and are notched out, as shown at 197 in Fig. 3, so as to avoid interference with the pivots 194. The ends of the slots just referred to are closed by small bridge plates 198 bolted to the ends of the arms of the spinner members 149. On their lower inner faces these bridge plates 198 are milled off to receive the resilient soft rubber cushion pieces 199 which normally force the lower ends of the blocks 193 toward the centers of the seaming heads C and D. It is obvious that when one of the crimping rolls encounters an insurmountable obstruction, such as a bump caused by the longitudinal seam of the can body, the rubber will yield sufficiently to permit the roll to swing slightly on its pivot and thus relieve the abnormal pressure.

It should be understood that my invention is capable of many modifications without departing from the spirit of the invention, and therefore I do not wish to be limited to the details of construction shown, except as specified in the appended claims.

I claim—

1. The combination of a continuously traveling conveyer adapted to engage and propel a series of objects to be operated upon, a reciprocatory carrier, devices carried by said carrier for operating upon said objects, means for advancing said carrier for a limited distance at the same speed and in the same direction as the said objects are traveling and for afterward retracting said carrier, means for engaging said objects with the operating devices while the carrier is traveling synchronously with said objects, means for driving said operating devices, power-transmitting means adapted to actuate said operating devices continuously, and controlling means for said operating devices synchronized with said reciprocating means.

2. In a can sealing machine, the combination of a continuously traveling conveyer adapted to engage and propel a succession of cans to be operated upon, a reciprocatory carrier, a seaming head on said carrier, seaming devices mounted on said seaming head and adapted to travel around the axis of said head in an orbit corresponding with the seam to be formed, means for advancing said carrier for a limited distance at the same speed and in the same direction as the can bodies are caused to travel by said conveyer and for afterward retracting said carrier, means for engaging said can bodies with the seaming devices, and driving means for said seaming head.

3. In a can seaming machine, the combination of a continuously traveling conveyer adapted to engage and propel a succession of cans to be operated upon, a reciprocatory carrier, a seaming head on said carrier, seaming devices mounted on said seaming head and adapted to travel around the axis of said head in an orbit corresponding with the seam to be formed, means for advancing said carrier for a limited distance at the same speed and in the same direction as the can bodies are caused to travel by said conveyer and for afterward retracting said carrier, means for engaging said can bodies with the seaming devices, driving means for said seaming head, and controlling means for said engaging means operated synchronously with said conveyer and carrier.

4. The combination of a traveling conveyer adapted to engage and propel a series of can bodies to be seamed, means for continuously actuating said conveyer in one direction only, a carrier, means for advancing said carrier for a limited distance at the same speed and in the same direction as the can bodies are traveling and for afterward retracting said carrier synchronized with said conveyer-actuating means, a seaming head mounted on said carrier, a seaming tool associated with said head, means for moving the can bodies into the field of the seaming tool while the carrier is traveling synchronously with said can bodies, means for engaging the seaming tool with the can bodies while in said field, and connections for continuously actuating said seaming tool.

5. The combination of a traveling conveyer adapted to engage and propel a succession of objects to be operated upon, a carrier, means mounted on said carrier for operating upon said objects, means for advancing said carrier for a limited distance at the same speed and in the same direction as the said objects and for afterward retracting said carrier, said means being synchronized with the conveyer, chucking mechanism synchronized with said carrier-actuating means and carried by said carrier, and means for actuating said operating devices carried by said carrier.

6. The combination of a continuously traveling chain conveyer adapted to propel a series of objects to be operated upon, a main frame, a carrier adapted to reciprocate upon said main frame in a direction parallel with the direction of travel of said objects, means mounted on said carrier for operating upon said objects, means for synchronizing the reciprocations of said carrier with said conveyer whereby the carrier is caused to advance for a certain distance at the same speed and in the same direction as the said objects, chucking mechanism carried by said carrier, and means for actuating said chucking mechanism to engage said objects during the period of synchronous travel of said objects and carrier.

7. The combination of a continuously traveling conveyer provided with a succession of engaging devices for propelling a series of objects to be operated upon, a main frame, a carrier adapted to reciprocate on said main frame, a portion of the reciprocation of said carrier in one direction being at the same speed and in the same direction as the travel of the said objects, devices carried by said carrier for operating upon said objects, a pair of opposed chucking members carried by said carrier for engaging the objects to be operated upon, means for engaging said chucking members with the objects synchronized with said carrier, and means for engaging said operating devices with said objects and synchronized with said carrier.

8. The combination of a continuously traveling conveyer provided with a succession of engaging devices for propelling a series of objects to be operated upon, a main frame, a carrier adapted to reciprocate on said main frame, a portion of the reciprocation of said carrier in one direction being at the same speed and in the same direction as the travel of the said objects, devices carried by said carrier for operating upon said objects, a pair of opposed chucking members carried by said carrier for engaging the objects to be operated upon, means for advancing said chucking members toward each other, means for engaging said operating devices with said objects and synchronized with said carrier, and means for driving said operating devices continuously.

9. In a can-heading machine, the combination of a continuously traveling conveyer adapted to engage and propel a succession of cans to be operated upon, a main frame, a reciprocatory carrier mounted on said main frame adapted during a portion of its movement to travel in the same direction and at the same speed as the objects, a seaming head on said carrier, a seaming tool mounted on said head, a pair of opposed chucking members adapted to engage a can body and prevent rotation of the head and body, and means for actuating said chucking members.

10. In a can-heading machine, the combination of a continuously traveling conveyer adapted to engage and propel a succession of cans to be operated upon, a main frame, a reciprocatory carrier mounted on said main frame adapted during a portion of its movement to travel in the same direction and at the same speed as the cans, a seaming head on said carrier, a seaming tool mounted on said head, a pair of opposed chucking members adapted to engage a can body and prevent rotation of the head and body, means for actuating said chucking members during the synchronized movement of said carrier and objects, and means for continuously actuating said seaming tool.

11. In a can-heading machine, the combination of a continuously traveling conveyer adapted to engage and propel a succession of cans to be operated upon, a main frame, a reciprocatory carrier mounted on said main frame adapted during a portion of its movement to travel in the same direction and at the same speed as the cans, a seaming head on said carrier, a seaming tool mounted on said head, a pair of opposed chucking members adapted to engage a can body and prevent rotation of the head and body, means for actuating said chucking members during the synchronized movement of said carrier and cans, means for continuously actuating said seaming tool, and means for engaging said seaming tool with the can body.

12. In a can-heading machine, the combination of a continuously traveling conveyer adapted to engage and propel a succession of cans to be operated upon, a main frame, a reciprocatory carrier mounted on said main frame adapted during a portion of its movement to travel in the same direction and at the same speed as the cans, a seaming head on said carrier, a seaming tool mounted on said head, a pair of opposed chucking members adapted to engage a can body and prevent rotation of the head and body, means for actuating said chucking members during the synchronized movement of said carrier and objects, means for continuously actuating said seaming tool, and means for engaging said seaming tool with the can body during the synchronized movement of said carrier and objects.

13. In a can-heading machine, the combination of a continuously traveling chain conveyer adapted to engage and propel a series of cans to be operated upon, a main frame, a carrier adapted to reciprocate on said frame parallel to the line of travel of said conveyer and adapted during a portion of its movement on said frame to travel in the same direction and at the same speed as said conveyer, a seaming head mounted on said carrier, planetary crimping rolls associated with said head, means for rotating said rolls continuously on said head, a chucking member carried by said head, a companion chucking member adapted to advance a can body into engagement with the first named chucking member and into the field of said crimping rolls during the synchronized movement of said carrier and conveyer, means for actuating said last named chucking member, and means for engaging the crimping rolls with the can seam during the synchronized movement of said carrier.

14. In a can-heading machine, the combination of a continuously traveling chain conveyer adapted to engage and propel a series of objects to be operated upon, a main frame, a carrier adapted to reciprocate on said frame parallel to the line of travel of said conveyer and adapted during a portion of its movement on said frame to travel in the same direction and at the same speed as said conveyer, a seaming head mounted on said carrier, planetary crimping rolls associated with said head, means for rotating said rolls continuously on said head, a chucking member carried by said head, a companion chucking member associated with said carrier and adapted to advance a can body into engagement with the first named chucking member and into the field of said crimping rolls during the synchronized movement of said carrier and conveyer, means for actuating said last named chucking member, means for engaging the crimping rolls with the can seam during the synchronized movement of said carrier, and means for reciprocating said companion chucking member with said carrier.

15. The combination of a continuously traveling conveyer adapted to propel a succession of objects to be operated upon, a main frame, a carrier adapted to reciprocate on said frame, means for reciprocating said carrier parallel with said conveyer, said carrier being adapted during a portion of its movement to move in the same direction and at the same speed as said conveyer, means associated with said carrier for operating upon said objects, and means for disengaging an object from the conveyer during the synchronized movement of the carrier and object.

16. The combination of a continuously traveling conveyer adapted to propel a succession of objects to be operated upon, a main frame, a carrier adapted to reciprocate on said frame, means for reciprocating said carrier parallel with said conveyer, said carrier being adapted during a portion of its movement to move in the same direction and at the same speed as said conveyer, means associated with said carrier for operating upon said objects, and means for disengaging an object from the conveyer during the synchronized movement of the carrier with the objects on the conveyer and object and reëngaging said object with the conveyer before the termination of said synchronized movement.

17. The combination of a continuously traveling chain conveyer adapted to engage and propel a series of objects to be operated upon, a main frame, a carrier, means for reciprocating said carrier on said frame parallel with said chain conveyer and adapted to cause the carrier during a portion of said reciprocatory movement to travel at the same speed and in the same direction as the objects on said conveyer, means for operating upon said objects associated with said carrier, means for engaging the objects with the operating means on said carrier during the said synchronized portion of its movement with the objects on the conveyer, and means for transferring said objects out of engagement with the chain and into the field of said operating means during said synchronous movement.

18. The combination of a continuously traveling chain conveyer adapted to engage and propel a series of objects to be operated upon, a main frame, a carrier, means for reciprocating said carrier on said frame parallel with said chain conveyer and adapted to cause the carrier during a portion of said reciprocatory movement to travel at the same speed and in the same direction as the objects on said conveyer, means for operating upon said objects associated with said carrier, means for engaging the objects with the operating means on said carrier during the said synchronized portion of its movement, and a reciprocatory chucking member adapted to transfer the object from engagement with the chain and into the field of said operating means.

19. The combination of a continuously traveling chain conveyer adapted to engage and propel a series of objects to be operated upon, a main frame, a carrier, means for reciprocating said carrier on said frame parallel with said chain conveyer and adapted to cause the carrier during a portion of said reciprocatory movement to travel at the same speed and in the same direction as the objects on said conveyer, means for operating upon said objects associated with said carrier, means for engaging the objects with the operating means on said carrier during the said synchronized portion of its movement with the objects on the conveyer, and a reciprocatory seat embracing said chain adapted to prevent rotation of said objects and transfer them into the field of the operating devices.

20. The combination of a continuously traveling chain conveyer adapted to engage and propel a series of objects to be operated upon, a main frame, a carrier, means for reciprocating said carrier and said frame parallel with said chain conveyer and adapted to cause the carrier during a portion of said reciprocatory movement to travel at the same speed and in the same direction as the objects on said conveyer, means for operating upon said objects associated with said carrier, means for engaging the objects with the operating means on said carrier during the said synchronized portion of its movement with the objects on the conveyer, a reciprocatory chucking member adapted to prevent rotation of said objects and transfer same into the field of said operating devices, and means for actuating said chucking member during said synchronous movement of said chain and carrier.

21. The combination of a continuously traveling chain conveyer adapted to engage and propel a series of objects to be operated upon, a main frame, a carrier, means for reciprocating said carrier on said frame parallel with said chain conveyer and adapted to cause the carrier during a portion of said reciprocatory movement to travel at the same speed and in the same direction as the objects on said conveyer, means for operating upon said objects associated with said carrier, means for engaging the objects with the operating means on said carrier during the said portion of its reciprocatory movement, a reciprocatory chucking member adapted to prevent rotation of said objects and transfer the same into the field of said operating devices, and means for actuating said chucking member during said synchronous movement of said chain and carrier, said chucking member being adapted to reciprocate with said carrier.

22. In a can-heading machine, the combination of a continuously traveling conveyer adapted to engage and propel a succession of cans to be operated upon, a carrier, means for reciprocating said carrier parallel with said conveyer and synchronized with said conveyer during a portion of one of its reciprocations, seaming mechanism mounted on said carrier adapted to operate simultaneously upon a plurality of cans, means for operating said seaming mechanism continuously, means for transferring simultaneously a plurality of said cans into the field of said seaming mechanism during said synchronized movement of the conveyer and carrier, and means for engaging the cans with said seaming mechanism while in said field.

23. In a can-heading machine, the combination of a continuously traveling chain conveyer adapted to engage and propel a succession of cans to be operated upon, a main frame, a carrier adapted to reciprocate on said frame parallel with said chain, means for synchronizing a portion of said reciprocatory movement of said carrier with the movement of the cans propelled by said chain, a plurality of seaming heads mounted on said carrier, crimping rolls adapted to rotate on said heads, a plurality of chucking mechanisms for transferring a plurality of cans into engagement with said seaming heads and adapted to reciprocate with said carrier, and a common actuating member for said chucking mechanisms.

24. In a can-heading machine, the combination of a continuously traveling chain conveyer adapted to engage and propel a succession of cans to be operated upon, a main frame, a carrier adapted to reciprocate on said frame parallel with said chain, means for synchronizing a portion of said reciprocatory movement of said carrier with the movement of the cans propelled by said chain, a plurality of seaming heads mounted on said carrier, crimping rolls adapted to rotate on said heads, a plurality of chucking mechanisms for transferring a plurality of cans into engagement with said seaming heads and adapted to reciprocate with said carrier, a common actuating member for said chucking mechanisms, means for actuating said common member during the synchronized movement of said carrier with the cans, and means for engaging the crimping rolls with the cans after the cans are chucked.

25. In a seaming head, the combination of a carrier, a controller therefor, means for rotating said parts co-axially with, and at the same average speed around, the axis of the head, a pair of planetary crimping rolls, eccentric shaft mountings for said rolls on said carrier, links connected at one end to said controller and at the other ends eccentrically to said shafts, and means for oscillating said controller relative to said carrier to actuate said links.

26. In a seaming head, the combination of a carrier, a controller therefor, means for rotating said carrier and controller coaxially with, and at the same average speed around, the axis of the head, a shaft mounted on said carrier with its axis parallel to the axis of the head, a crimping roll eccentrically pivoted on said shaft, a link pivoted eccentrically on said shaft and pivotally connected to a point on, and spaced apart from the center of, said controlling member, and means for oscillating said controller relative to said carrier to oscillate said shaft.

27. In a can-seaming head, the combination of a carrier, a controller therefor, a seaming tool mounted on said carrier, a controlling connection between said controller and said seaming tool adapted to actuate the latter by the relative angular displacement of said carrier and controller, two co-axially mounted bevel gears connected to said carrier and controller, respectively, a connecting bevel gear adapted to mesh with both of said first named bevel gears, an intermediate gear connection between one of said first named bevel gears and one of said two first named parts to cause the latter to rotate in the same direction, said train of gearing being adapted to cause rotation of said parts at the same average rotative speed, and means for effecting a bodily movement of said connecting bevel gear around the axis of the first two bevel gears to effect a change in the relative angular positions of said controller and carrier.

28. In a can-heading machine, the combination of a movable carrier, a plurality of seaming heads on said carrier adapted to operate upon a plurality of cans contemporaneously, independent seaming tools carried by said heads, and a stationary cam member connected to said carrier and operating to effect simultaneous engagement of said seaming tools with the series of cans being operated upon by said heads contemporaneously by the movement of said carrier.

29. In a can-heading machine, the combination of a movable carrier, a plurality of seaming heads on said carrier adapted to operate upon a plurality of cans contemporaneously, independent seaming tools carried by said heads, a stationary cam member connected to said carrier and operating to effect simultaneous engagement of said seaming tools with the series of cans being operated upon by the heads contemporaneously by the movement of said carrier, gearing adapted to drive all of said seaming heads continuously and simultaneously, and gearing connecting said common cam member with each of said seaming tools.

HARRY H. HOOD.

Witnesses:
C. A. SOANS,
MARY M. LEPPO.